United States Patent [19]

Jean

[11] Patent Number: 4,713,584
[45] Date of Patent: Dec. 15, 1987

[54] VEHICLE LIGHT CONTROL SYSTEM FOR AUTOMOTIVE VEHICLES

[76] Inventor: Pierre-Paul Jean, 620, avenue Georges, St-Louis-de-France, Quebec, Canada, G8T 8V6

[21] Appl. No.: 28,125

[22] Filed: Mar. 19, 1987

[51] Int. Cl.$^4$ ............................................. B60Q 1/02
[52] U.S. Cl. .................................. 315/83; 307/10 LS; 315/82; 340/642
[58] Field of Search .................... 340/642; 307/10 LS; 315/82, 83

[56] References Cited

U.S. PATENT DOCUMENTS

| | | | |
|---|---|---|---|
| 3,337,846 | 8/1967 | Hollins | 315/82 |
| 3,397,342 | 8/1968 | Dill | 315/82 |
| 3,774,071 | 11/1973 | Goodrich | 315/83 |

*Primary Examiner*—Harold Dixon

[57] ABSTRACT

A vehicle light control system for controlling the low beam of headlights of a vehicle. The system comprises a first and a second switching device with the first switching device being in a normally conductive state and the second device being in a normally non-conductive state. The first switching device is connected to the alternator of a vehicle to tap a supply voltage therefrom. The second conductive device is condition by the first conductive device and is also connected to a supply voltage to feed the low beams of the headlights when conditioned to do so by the first switching device. The headlight switch of the vehicle when switched on the high beams cuts off the first switching device and the supply voltage to the low beams. The supply voltage fed to the low beams is further reduced whereby not to subject the low beams to full intensity whereby to prolong their life span.

9 Claims, 1 Drawing Figure

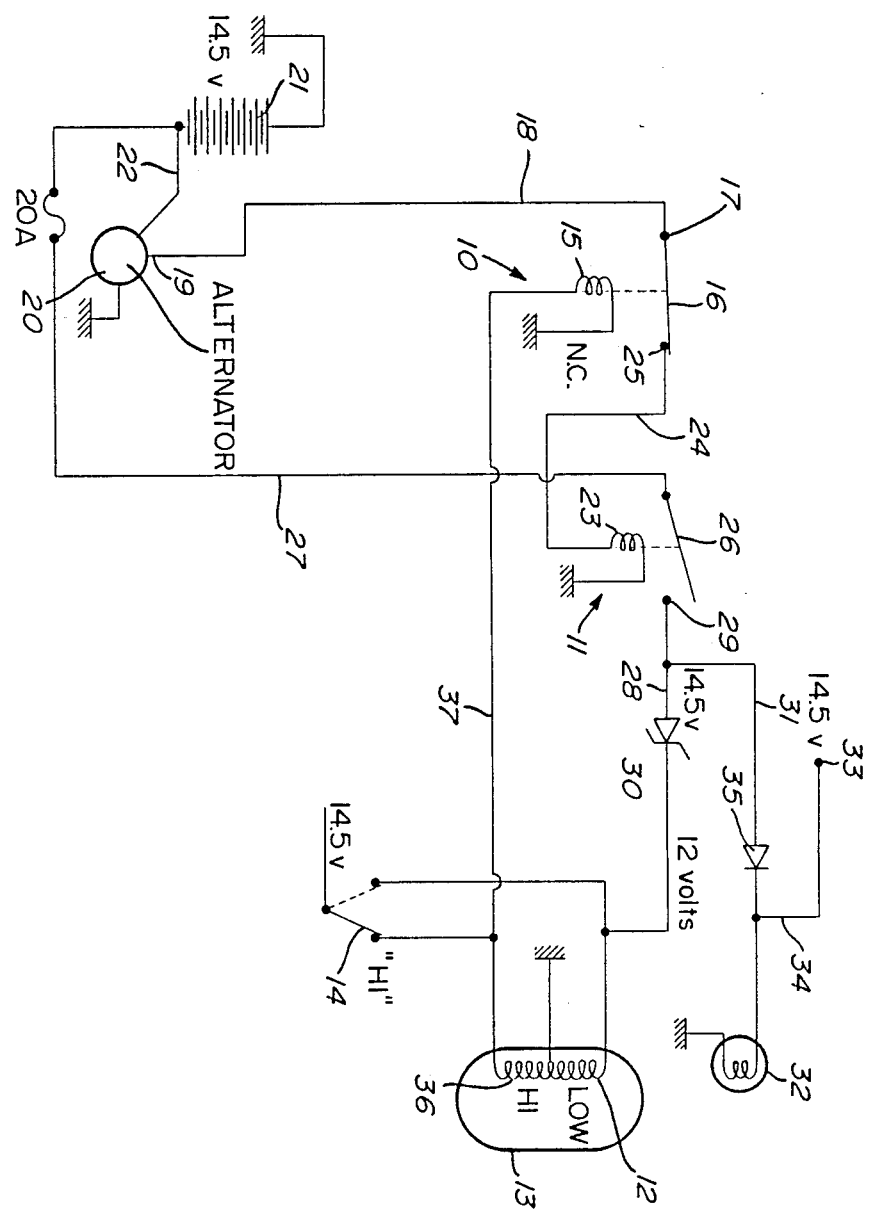

VEHICLE LIGHT CONTROL SYSTEM FOR AUTOMOTIVE VEHICLES

BACKGROUND OF THE INVENTION

1. Field of the Invention

The present invention relates to an improved vehicle light control system for operating the low beams of an automotive vehicle and including two switching devices whereby one device conditions the other to supply a reduced voltage to the low beams of headlights of a vehicle.

2. Description of Prior Art

It is known to provide automatic light control systems for daylight driving such as described, for example, in U.S. Pat. No. 3,832,597 granted on Aug. 27, 1974. In the particular circuit described, the headlights are activated only when the transmission is set in the forward drive position. U.S. Pat. No. 3,706,005 teaches another such system utilizing a three-phase generator. It also teaches the reduction of the voltage on the filaments of the headlights to obtain lower intensity of these running lights. U.S. Pat. No. 3,341,736 describes a still further system.

SUMMARY OF INVENTION

It is a feature of the present invention to provide an improved vehicle light control system which is easy to install, utilizes component parts readily available, and which does not require any modification to existing component parts of an automotive vehicle, and wherein the circuit automatically cuts off when the car headlight switch is switched on.

Another feature of the present invention is to provide an improved vehicle light control system which feeds a supply voltage to the low beam of the headlights, the tail lights, the marker lights and the license plate light of a vehicle as soon as the vehicle is in operation.

Another feature of the present invention is to provide an improved vehicle light control system and wherein the supply operating voltage of the system is obtained from the alternator of the vehicle whereby the control system automatically cuts out when the battery charging system is not functioning in order to protect the battery charge so that the engine of a vehicle will run as long as possible.

According to the above features, from a broad aspect, the present invention provides a vehicle light control system comprising a first and a second switching device. The first switching device is in a normally conductive state while the second switching device is in a normally non-conductive state. The first switching device has an input connection securable to a terminal of an alternator of the automotive vehicle. The alternator is connected to a car battery and provides a supply voltage when the engine of the vehicle is operated. The first switching device further has an output connection connected to the second switching device to change the operating state thereof when the supply voltage is present on the input connection. The second switching circuit has a low beam connection to which the car battery supply voltage is connected and fed to a low beam filament of headlights of the vehicle. The first switching device has a third connection which is securable to a vehicle headlight switch at high beam position so that when the headlight switch is placed to a high beam position the first switching device is placed in a non-conductive state which, in turn, automatically places the second switching device in a non-conductive state to cut off the supply voltage to the low beam connection.

BRIEF DESCRIPTION OF DRAWINGS

A preferred embodiment of the present invention will now be described with reference to the accompanying drawings which is a schematic illustration of the improved vehicle headlight control system of the present invention.

DESCRIPTION OF PREFERRED EMBODIMENTS

Referring now to the drawing, the vehicle light control system comprises a first and a second switching device 10 and 11, respectively. These switching devices are herein represented as single arm relays but equivalent semiconductor switching circuits may be substituted to effect the same function as will be described hereinbelow. The first switching device 10 is normally in a conductive state while the second switching device 11 is normally in a non-conductive state. These switching devices are operated whereby to apply a reduced voltage to the low beam filament 12 of the vehicle headlights 13 and to disconnect this low voltage therefrom automatically when the dash headlight switch 14 in the vehicle (not shown) is actuated to an "ON" position.

The first switching relay 10 is provided with a relay coil 15 and a normally closed contact arm 16. The terminal 17 of the contact arm has a wire input connection 18 secured thereto and which is securable at an opposed end to a terminal 19 of the alternator 20 of the vehicle. Alternator 20 is connected to the car battery 21 through connection 22. When the engine of the vehicle is operated the alternator is placed in operation and the battery voltage, namely 14.5 volts, is present on the alternator terminal 19 and thus on the contact arm 16 which is normally closed. Accordingly, this supply voltage is fed to the switching relay 11 via the output connection 24 from the engageable terminal 25 of the switch arm 16 of the first relay 10.

It can therefore be seen that once the engine is placed into operation, voltage is immediately applied to the relay coil 23 of the second switching relay 11 thus closing its normally open contact arm 26. This contact arm 26 has a low beam connecting wire 27 connected thereto and directly to the battery 21 or any other point in the electrical system of the vehicle where the 14.5-volt supply is present. This supply voltage is then fed to an output connection 28 from the engageable terminal 29 of the contact 26. A Zener diode 30 is connected in this output connection 28 whereby to reduce the input voltage of 14.5 volts to an output voltage of 12 volts. This output voltage is connected directly to the low beam filament 12 of the headlights 13. Accordingly, as soon as the engine is started the low beam filaments are fed this reduced voltage to activate the low beams and prolonging the life of the low beam filament, as compared to applying the full votage to that filament.

A secondary light lighting connection 31 is also connected to the output connection 28 or the engageable terminal 29 of the second switching relay 11 and it connects the 14.5 volts to other lights of the vehicle such as the tail lights, side or marker lights, and license place lights, all of which are represented by the lamp 32.

The light switch of the vehicle on the dash panel (not shown) thereof is nearly always provided with a first switch position as herein represented by switch contact 33 and that switch contact or connection is branched to the secondary image 32 through connection 34. This switch contact 33 feeds an auxiliary supply voltage of 14.5 volts from any suitable tapping in the vehicle to the secondary lamps 32 when the supply voltage at the output connection 28 is not present. In order to prevent this auxiliary supply voltage on connection 34 to be fed back to the low beam filament 12, a blocking diode 35 is placed between the connection 34 and connection 31. This diode 35 only permits the voltage to flow in the direction from the second switching relay 11 to the secondary lamps 32.

When the main switch 14 is placed to the "HI" beam position to switch on the headlights, high-beam filament 36, immediately the 14.5-volt supply is applied to the relay coil 15 of the first switching relay 10 through the connection 37. This automatically opens the contact arm 16 and both switching relays 10 and 11 are in a non-conductive state thereby removing the supply to the low beam and auxiliary lights which are now fed by the normal wiring of the electric circuit of the automotive vehicle. When the switch 14 is disposed from the "HI" position the low beams are automatically activated again, as long as the engine is running. Thus, the low beams are always "on" if the engine is running and the "HI" beam switch position is "off".

It should be appreciated that the light control system of the present invention is economical to construct, and easy to install. The circuit may also include a further auxiliary connection leading to the tail lights of a trailer vehicle so that as soon as the automotive vehicle is started, the trailer tail lights are actuated. Also, the facts that many of the vehicle lights are always "on" while the engine is running helps in preventing the user from forgetting to switch off the lighting system. That is to say, when the occupant leaves the vehicle he becomes more aware that the vehicle lights are in an "ON" position. This circuit can also support a 30-amp charge. Still further, it is believed that the use of such circuits will reduce car accidents, particularly before sunset when often a person will forget to switch on the vehicle headlights.

It is within the ambit of the present invention to include any obvious modifications of the circuit as herein described, provided such modifications fall within the scope of the appended claims.

I claim:

1. A vehicle light control system comprising a first and a second switching device, said first switching device being in a normally conductive state, said second switching device being in a normally non-conductive state, said first switching device having an input connection securable to a terminal of an alternator of said automobile vehicle, said alternator being connected to a car battery supply and providing a supply voltage when an engine of said vehicle is operated, said first switching device further having an output connection connected to said second switching device to change the operating state thereof when said supply voltage is present on said input connection, said second switching circuit having a low beam connection to which said car battery supply voltage is connected and fed to a low beam filament of headlights of said vehicle, said first switching device having a third connection securable to a vehicle headlight switch high beam position so that when said headlight switch is placed to said high beam position said first switching device is placed in a non-conductive state which in turn automatically places said second switching device in a non-conductive state to cut off said supply voltage to said low beam connection.

2. A vehicle light control system as claimed in claim 1 wherein there is further provided voltage reducing means connected to said low-beam connection to reduce said supply voltage to a reduced low beam supply voltage.

3. A vehicle light control system as claimed in claim 2 wherein said voltage reducing means is a Zener diode.

4. A vehicle light control system as claimed in claim 3 wherein said secondary lights include parking lights, side marker lights and a license plate light of said vehicle.

5. A vehicle light control system as claimed in claim 2 wherein there is further provided a secondary lighting connection connected to said low beam connection to connect said supply voltage to secondary lights of said vehicle.

6. A vehicle light control system as claimed in claim 5 wherein a vehicle secondary light switch is connected to said secondary light to feed an auxiliary supply voltage to said secondary lights when said supply voltage at said secondary lighting condition is not present, and a blocking diode to prevent said auxiliary supply voltage to feed said low beam filament connected to said secondary lighting connection.

7. A vehicle light control system as claimed in claim 1 wherein said first and second switching devices are first and second relays, respectively.

8. A vehicle light control system as claimed in claim 7 wherein said first relay has a normally closed contact arm and a relay coil, said input connection thereof being connected to said contact arm, said output connection being connected to an engageable terminal of said contact arm, said vehicle headlight switch connecting a battery supply to said coil when placed in said headlight switch is placed in an operating position.

9. A vehicle light control system as claimed in claim 8 wherein said second relay has a normally open contact arm and a relay coil, said relay coil being connected to said engageable terminal of said first relay, said contact arm of said second relay being connected to said battery supply, said second relay contact arm having an engageable terminal to which is connected said low beam connection.

* * * * *